(12) United States Patent
Xie

(10) Patent No.: US 10,114,227 B2
(45) Date of Patent: Oct. 30, 2018

(54) LIQUID CRYSTAL LENS AND 3D DISPLAY

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 233 days.

(21) Appl. No.: 15/125,192

(22) PCT Filed: Jul. 12, 2016

(86) PCT No.: PCT/CN2016/089783
§ 371 (c)(1),
(2) Date: Sep. 12, 2016

(87) PCT Pub. No.: WO2017/219407
PCT Pub. Date: Dec. 28, 2017

(65) Prior Publication Data
US 2018/0217392 A1    Aug. 2, 2018

(30) Foreign Application Priority Data

Jun. 22, 2016  (CN) .......................... 2016 1 0458286

(51) Int. Cl.
*G02F 1/1339* (2006.01)
*G02B 27/22* (2018.01)
*G02B 1/14* (2015.01)
*G02B 3/12* (2006.01)
*G02F 1/1335* (2006.01)
*G02B 5/30* (2006.01)
*G02B 1/08* (2006.01)
*G02F 1/13363* (2006.01)

(52) U.S. Cl.
CPC ........... *G02B 27/2242* (2013.01); *G02B 1/08* (2013.01); *G02B 1/14* (2015.01); *G02B 3/12* (2013.01); *G02B 5/3083* (2013.01); *G02B 27/225* (2013.01); *G02F 1/13363* (2013.01); *G02F 1/13392* (2013.01); *G02F 1/133526* (2013.01); *G02F 2001/133638* (2013.01)

(58) Field of Classification Search
CPC ............. G02F 1/13392; G02F 1/13363; G02F 2001/133638
See application file for complete search history.

(56) References Cited

FOREIGN PATENT DOCUMENTS

| CN | 1955822 A | 5/2007 |
| CN | 101174050 A | 5/2008 |
| CN | 101303487 A | 11/2008 |

(Continued)

*Primary Examiner* — Kendrick Hsu
(74) *Attorney, Agent, or Firm* — Andrew C. Cheng

(57) ABSTRACT

The present disclosure provides a liquid crystal lens, comprising: an upper substrate, a lower substrate, and both a liquid crystal layer and spacers disposed between the upper substrate and the lower substrate; wherein the surfaces of the spacers are coated with λ/4 phase retardation film. Via the method of disposing a λ/4 phase retardation film on the surface of the spacers in the present disclosure, a part of light emitting into the λ/4 phase retardation film cannot be reflected from the film and then further decreasing leaking light caused from reflective light of spacers to achieving objects of increasing the contrast of the picture and improving 3D displaying efficiencies.

18 Claims, 2 Drawing Sheets

(56) References Cited

FOREIGN PATENT DOCUMENTS

| CN | 102207657 A | 10/2011 |
|---|---|---|
| CN | 202794719 U | 3/2013 |
| CN | 105647253 A | 6/2016 |
| JP | 2001215517 A | 8/2001 |

LIQUID CRYSTAL LENS AND 3D DISPLAY

CROSS REFERENCE TO RELATED APPLICATION

This application claims the priority of Chinese Patent Application No. 201610458286.7, entitled "Liquid Crystal Lens and 3D Display", filed on Jun. 22, 2016, the disclosure of which is incorporated herein by reference in its entirety.

FIELD OF THE INVENTION

The disclosure is related to 3-dimensional (3D) display technical field, in particular to liquid crystal lens and 3D displays having the liquid crystal lens.

BACKGROUND OF THE INVENTION

Watching words and pictures in three-dimensional (3D) image efficiencies without using special glasses can be achieved by naked-eye 3D display technology to provide technology closer to users' daily habits. Furthermore, the naked-eye 3D display technology is the trend of development in the future as well.

The liquid crystal lens is applied in the naked-sys 3D display technology, and has advantages of easy to control, strong reliability and low driving voltage to possess huge potential applicability. However, during the procedure of realistic design, because thickness of the liquid crystal lens of the liquid crystal layer is larger, larger spacers to support cell thickness for the liquid crystal cell is needed. Spacers have a certain influences to directions of reflective light emitted from the display panel to change light distributions of different direction in watching areas; thus the contrast is decreased and the color is getting worse for displaying efficiencies; furthermore, the bigger the volume is, the worse situation becomes. Especially in the dark situations, when stronger light is reflective externally, the spacers turn the reflective light into obvious speckles, and cause higher dark-state brightness to reduce the contrast; furthermore, the total 3D displaying efficiencies are influenced.

SUMMARY OF THE INVENTION

An object of the present disclosure is to provide a liquid crystal lens which is able to increase the contrast of the picture and improve 3D displaying efficiencies.

Another object of the present disclosure is to provide another 3D display adopting the liquid crystal lens described above.

In order to achieve the above objects, technical plans of the present disclosure are provided as following:

The present disclosure provides a liquid crystal lens comprising an upper substrate, a lower substrate, and both a liquid crystal layer and spacers disposed between the upper substrate and the lower substrate; wherein the surfaces of the spacers are coated with $\lambda/4$ phase retardation film.

Wherein materials of the $\lambda/4$ phase retardation film comprise one element or more than one elements selected from cyclo olefin polymer, polycarbonate resin, polyethylene terephthalate and cellulose based polymer. Wherein the liquid crystal lens further comprises a protective film covering on a surface of the $\lambda/4$ phase retardation film.

Wherein the protective film comprises acrylic materials.

Wherein the spacers are distributed homogeneously between the upper substrate and the lower substrate.

Wherein the spacers are spherical.

Wherein diameters of the spacers are between 20 um and 50 um.

Wherein the spacers are made of adhesive resin.

Wherein the transparent rate of the adhesive resin is greater than 90%.

The present disclosure further provides a 3D display comprising a liquid crystal lens, and the liquid crystal lens comprises: an upper substrate, a lower substrate, and both a liquid crystal layer and spacers disposed between the upper substrate and the lower substrate; wherein the surfaces of the spacers are coated with $\lambda/4$ phase retardation film.

Wherein materials of the $\lambda/4$ phase retardation film comprise one element or more than one elements selected from cyclo-olefin polymer, polycarbonate resin, polyethylene terephthalate and cellulose based polymer.

Wherein the 3D display further comprises a protective film covering on a surface of the $\lambda/4$ phase retardation film.

Wherein the protective film comprises acrylic materials.

Wherein, the spacers are distributed homogeneously between the upper substrate and the lower substrate.

Wherein, the spacers are spherical.

Wherein, diameters of the spacers are between 20 um and 50 um.

Wherein, the spacers are made of adhesive resin.

Wherein the transparent rate of the adhesive resin is greater than 90%.

The present disclosure has advantages or beneficial efficiencies as following:

Via the method of disposing a $\lambda/4$ phase retardation film on the surface of the spacers in the present disclosure, a part of light emitting into the $\lambda 4$ phase retardation film cannot be reflected from the film and then further decreasing leaking light caused from reflective light of spacers to achieving objects of increasing the contrast of the picture and improving 3D displaying efficiencies. The 3D display in the present disclosure has a better picture contrast and a better 3D efficiency.

BRIEF DESCRIPTION OF THE DRAWINGS

In order to more clearly illustrate the present disclosure embodiment or technical solution in the art, the attached drawings, which need to be applied in the present disclosure embodiment or technical description in the art, will be introduced briefly as following. Apparently the attached drawings in the following descriptions only are some embodiments of the present disclosure. As those skilled in the art need not pay any creative work, other drawings are also obtained based on these attached drawing.

DETAILED DESCRIPTION OF THE PREFERRED EMBODIMENTS

To make objects, technical solutions and advantages of the present disclosure more clearer, technical solution in the embodiments of the present disclosure are described clearly and completely in the following with reference to accompanying drawings in the embodiments of the present disclosure. Apparently, the described embodiments are merely part rather than all off the embodiments of the present disclosure. All other embodiments obtained by persons of ordinary skill in the art based on the embodiments of the present disclosure without creative efforts shall fall within the protection scope of the present disclosure.

Figure 1:
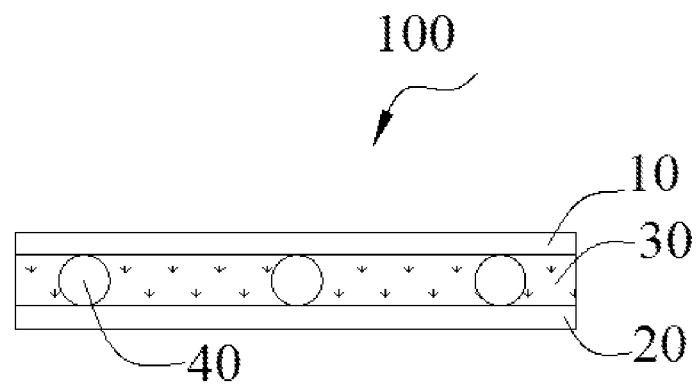
FIG. 1 shows the structural schematic diagram of a liquid crystal lens to the present disclosure.
Figure 2:
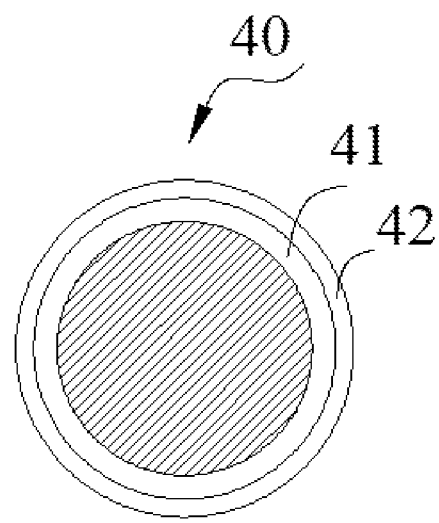
FIG. 2 is an enlarged schematic view of spacers shown in FIG. 1.

Please refer to FIG. 1 and FIG. 2, a liquid crystal lens 100 provided in the present disclosure comprises: an upper substrate 10, a lower substrate 20, and a liquid crystal layer 30 disposed between the upper substrate 10 and the lower substrate 20. Specifically, the upper substrate 10 is disposed corresponding to the lower substrate 20. On the upper substrate 10, a first electrode layer (not shown in figures) is disposed on a side which is close to the lower substrate 20; on the lower substrate 20, a second electrode layer (not shown in figures) is disposed on a side close to the upper substrate 10; and the liquid crystal layer 30 is disposed between the first electrode layer and the second electrode layer. There are spacers 40 further disposed within the liquid crystal layer 30; preferably, the spacers are distributed homogeneously between the upper substrate 10 and the lower substrate 20. The spacers 40 are supporting between the upper substrate 10 and the lower substrate 20 to separate the upper substrate 10 from the lower substrate 20. The surfaces of the spacers 40 are coated with λ/4 phase retardation film 41.

Figure 3:
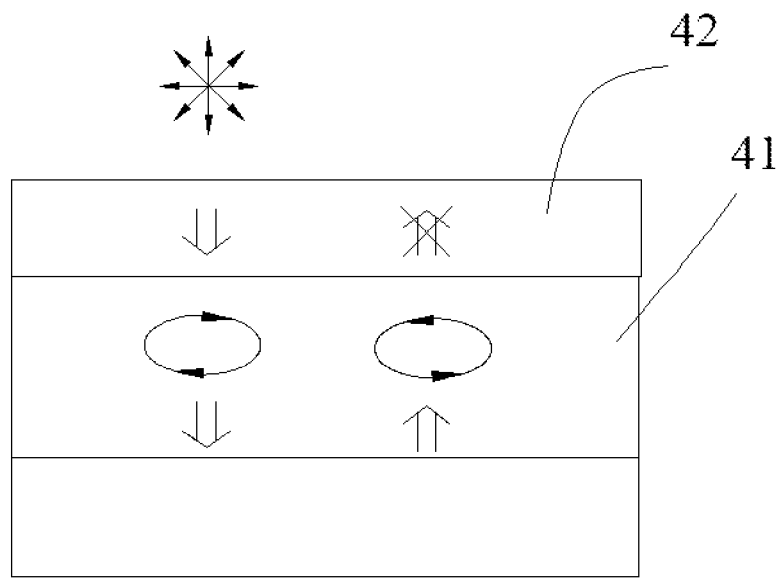
FIG. 3 is a schematic diagram of light path on the spacers shown in FIG. 2.

Please refer to FIG. 3, when external natural light emits to the surfaces of the spacers 40, the light has to pass by the λ/4 phase retardation film 41 firstly; after the natural light pass through the λ/4 phase retardation film 41, it turns into left-handed circularly polarized light then; when the left-handed circularly polarized light arrives the surface of the spacers 40, light is reflected at the surface of the spacers 40; the left-handed circularly polarized light turns into right-handed circularly polarized light after reflecting, and then reflections will be occurred at the surface of the spacers 40; after the left-handed circularly polarized light turns into the right-handed circularly polarized light because of light reflections, and the λ/4 phase retardation film 41 can only allow the left-handed circularly polarized light to pass through, so the right-handed circularly polarized light cannot pass through the λ/4 phase retardation film 41; in the other word, the reflective light is stopped at the λ/4 phase retardation film 41 and cannot be reflected, therefore, reflective light from the spacers are decreased then.

Via the method of disposing a λ/4 phase retardation film 41 of the surface of the spacers 40 in the present disclosure, a part of light emitting into the λ/4 phase retardation film 41 cannot be emitted out from the film, therefore, leaking light caused by the reflective light from the spacers can be decreased to achieving objects of increasing the contrast of the picture and improving 3D displaying efficiencies.

Furthermore, the λ/4 phase retardation film 41 can be electroplated on the surface of the spacers 40 by sputtering or vacuum depositing coating. Materials of the λ/4 phase retardation film 41 comprise but not limit to one element or more than one elements selected from cyclo-olefin polymer, polycarbonate resin, polyethylene terephthalate and cellulose based polymer.

In a preferred embodiment of the present disclosure, a protective layer 42 is further coated on the outside layer of the spacers 40. Usually, after electroplating a λ/4 phase retardation film 41 on the surfaces of the spacers 40, a protective film 42 is electroplated on the λ/4 phase retardation film 41 then. In other words, the λ/4 phase retardation film 41 is disposed between spacers 40 and the protective film 42. The protective layer is used to prevent the λ4 phase retardation film 41 from wearing to damage due to movements of the spacers 40. Particularly, the protective film comprises acrylic materials, and is characterized in having lower moisture penetration. The acrylic materials comprise an element or more than one elements of component list as following: The acrylic materials in the present disclosure comprise one component or more than one components listed as following: (meth) acrylate monomer) or (meth) acrylamide monomer of cycloaliphatic or aromatic ring based on polymethyl methacrylate (PMMA).

In embodiments of the present disclosure, the spacers 40 can be applied with photospacers (refer to as PS) or basll-spacers (refer to as BS). To a situation of larger cell thickness of the liquid crystal lens 100 in the present disclosure, the spacers 40 are preferably spherical. Diameters of BS 40 can between 20 um and 50 um. That is, a range of cell thickness of liquid crystal lens 100 is about between 20 um and 50 um. In other embodiments of the present disclosure, the spacers 40 are further can be strip shape and etc.

Furthermore, the spacers are made of adhesive resin; the transparent rate of the adhesive resin is greater than 90% to reduce the strength of reflective light.

Still more typically, materials of the upper substrate 10 and the lower substrate 20 can be glass or other transparent materials. For example, PET, SPET, PC, PMMA or glass, and persons skilled in the art can choose a proper material according the realistic situations.

Figure 4:
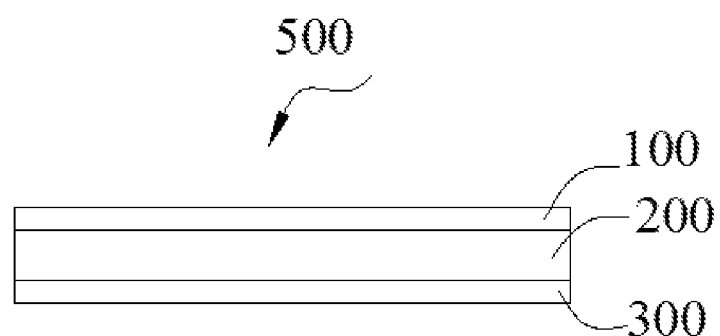
FIG. 4 is a structural schematic diagram of a liquid crystal lens within a 3D display shown in FIG. 1.

Please refer to FIG. 4, the present disclosure further provides a 3D display 500 comprising liquid crystal lens 100, liquid crystal displaying panel 200 and backlight 300 disposed in sequence. The liquid crystal lens 100 is any liquid crystal lens described above.

It can be understood that, the 3D display 500 can be applied but not limited to: e-papers, liquid crystal televisions, mobile phones, digital picture frames, tablet computers or any product or portions with displaying function.

Reference throughout this specification to "an embodiment", "some embodiments", "an example", "a specific example" or "some examples", means that a particular feature, structure, material, or characteristic described in connection with the embodiment or example is included in least one embodiment or example or the present disclosure. Thus, the appearances of the phrases such as "in an embodiment", "in some embodiments", "in an example, "in a specific example" or "in some examples", in various places throughout this specification are not necessarily referring to the same embodiment or example of the present disclosure. Furthermore, the particular features, structures, materials or characteristics may be combined in any suitable manner in one or more embodiments or examples.

The above embodiments are merely provided for elaborating the technical solution, but not intended to limit the technical solution. Modifications, equivalent substitutions and improvements made within the spirit and principle of embodiments should fall within the protection scope of the technical solution.

What is claimed is:

1. A liquid crystal lens comprises an upper substrate, a lower substrate, and both a liquid crystal layer and spacers disposed between the upper substrate and the lower substrate; wherein the surfaces of the spacers are coated with a λ/4 phase retardation film.

2. The liquid crystal lens according to claim 1, wherein materials of the λ/4 phase retardation film comprise one element or more than one elements selected from cyclo olefin polymer, polycarbonate resin, polyethylene terephthalate and cellulose based polymer.

3. The liquid crystal lens according to claim 1, wherein the liquid crystal lens further comprises a protective film covering on a surface of the λ/4 phase retardation film.

4. The liquid crystal lens according to claim 3, wherein the protective film comprises acrylic materials.

5. The liquid crystal lens according to claim 1, wherein the spacers are distributed homogeneously between the upper substrate and the lower substrate.

6. The liquid crystal lens according to claim 1, wherein the spacers are spherical.

7. The liquid crystal lens according to claim 6, wherein diameters of the spacers are between 20 um and 50 um.

8. The liquid crystal lens according to claim 6, wherein the spacers are made of adhesive resin.

9. The liquid crystal lens according to claim 8, wherein the transparent rate of the adhesive resin is greater than 90%.

10. A 3D display, wherein the 3D display comprises a liquid crystal lens, and the liquid crystal lens comprises: an upper substrate, a lower substrate, and both a liquid crystal layer and spacers disposed between the upper substrate and the lower substrate; wherein the surfaces of the spacers are coated with a λ/4 phase retardation film.

11. The 3D display according to claim 10, wherein materials of the λ/4 phase retardation film comprise one element or more than one elements selected from cyclo-olefin polymer, polycarbonate resin, polyethylene terephthalate and cellulose based polymer.

12. The 3D display according to claim 10, wherein the 3D display further comprises a protective film covering on a surface of the λ/4 phase retardation film.

13. The 3D display according to claim 12, wherein the protective film comprises acrylic materials.

14. The 3D display according to claim 10, wherein the spacers are distributed homogeneously between the upper substrate and the lower substrate.

15. The 3D display according to claim 10, wherein the spacers are spherical.

16. The 3D display according to claim 15, wherein diameters of the spacers are between 20 um and 50 um.

17. The 3D display according to claim 15, wherein the spacers are made of adhesive resin.

18. The 3D display according to claim 17, wherein the transparent rate of the adhesive resin is larger than 90%.

* * * * *